United States Patent [19]

Wegner

[11] Patent Number: 4,569,854

[45] Date of Patent: Feb. 11, 1986

[54] PROCESS FOR PREPARING NEGATIVE PLATES FOR USE IN A DRY CHARGE BATTERY

[75] Inventor: Paul C. Wegner, San Carlos, Calif.

[73] Assignee: Tiegel Manufacturing Company, Belmont, Calif.

[21] Appl. No.: 580,891

[22] Filed: Feb. 16, 1984

[51] Int. Cl.[4] .................... B05D 5/12; H01M 4/21
[52] U.S. Cl. ...................... 427/58; 429/214; 429/48; 106/14.13
[58] Field of Search ............ 429/48, 214; 427/58, 427/443; 106/14.13

[56] References Cited

U.S. PATENT DOCUMENTS

| 1,688,399 | 10/1928 | Reinhardt | 429/48 |
| 2,759,036 | 8/1956 | Greenburg et al. | 429/214 |
| 2,759,037 | 8/1956 | Greenburg et al. | 429/214 |

FOREIGN PATENT DOCUMENTS

| 1070423 | 6/1976 | Japan | 429/214 |

OTHER PUBLICATIONS

Pages 38–40 of Chapter 8 of "Storage Battery Manufacturing Manual #1".

Primary Examiner—Donald L. Walton
Attorney, Agent, or Firm—Benasutti & Murray

[57] ABSTRACT

Formed negative plates for use in dry charge storage batteries are treated with an aqueous solution of an oxidation inhibiting agent such as salicyclic acid or 2-naphthol, and then dried.

6 Claims, No Drawings

PROCESS FOR PREPARING NEGATIVE PLATES FOR USE IN A DRY CHARGE BATTERY

BACKGROUND OF THE INVENTION

The present invention relates generally to storage batteries, and in particular, to an improvement in the manufacture of dry charge batteries.

For a variety of reasons, it is often desirable to produce batteries in a dry, fully charged state. Primarily, this is because such batteries are capable of being stored for prolonged periods of time before activation for use by the addition of battery acid. Dry charge batteries are also more easily shipped and stored since, when in their dry state, such batteries are relatively light in weight and more safely handled than are comparable batteries containing battery acid. Since dry charge batteries retain their charge in prolonged storage, this process is particularly useful in connection with batteries for which turn around time is very slow, such as industrial batteries.

As is well known in the art, the positive plates of such batteries present little difficulty in manufacture since they can be dried in the open air without harmful effect. However, the negative plates of such batteries tend to react with oxygen in the air during drying after the bulk of the water has been removed. During this stage of drying the sponge lead in the negative plates oxidizes fast enough to give off steam. This results in oxidation of the negative plates, leaving them inactive and rendering them useless.

To prevent oxidation of the negative plates during drying, it is generally necessary either to exclude oxygen from the drying atmosphere or to dry the plates in the presence of a suitable oxidation inhibitor. Both methods have been attempted in the prior art, with varying degrees of success, and at varying cost.

It has been proposed, for example, to exclude oxygen from the negative plates by drying them with steam or kerosene. Oxygen may also be excluded by drying the plates in a vacuum. This is, of course, an expensive procedure.

Another method of protecting the negative plates against oxidation during drying is to dry them in an atmosphere of carbon dioxide. In such case, the carbon dioxide reacts with the surface layer of lead to form a water insoluble (0.0011 grams/liter) layer of lead carbonate which protects the underlying lead from oxidation, but which readily decomposes in battery acid. Such protection is analogous to the well-known passivation of highly active metallic aluminum by the formation of an insoluble layer of aluminum oxide to prevent further oxidation. When negative lead plates passivated with carbon dioxide are contacted with battery acid, the lead carbonate layer is converted back to lead sulfate, with the evolution of carbon dioxide, leaving the plates in activated condition. This method of passivation is also desirable in that it does not poison the plates. However, a disadvantage is that such passivated plates are not waterproof, and therefore tend to absorb water from the atmosphere and slowly lose their electrical charge under humid storage conditions.

Chemical inhibitors have also been employed to prevent or reduce the rate of oxidation of negative plates during drying. For example, formed and washed negative plates may be soaked in a hot solution of boric acid and then dried in air. However, this method requires high concentrations of boric acid, i.e., 5 to 10%, and is only marginally effective in reducing oxidation during drying. It has been found, moreover, that boric acid treatment reduces the cranking performance of the plates on cycling. Another serious disadvantage is that boric acid does not waterproof the plates, with the result that they tend to absorb water and lose their charge, particularly when stored under humid conditions.

Another chemical inhibitor which has been employed is 1-hydroxy-2-naphthoic acid. However, again, relatively high concentrations (approximately 10% by weight) are required for use in aqueous solution. For this reason, this constituent has generally been added to the lead paste which is used in manufacturing the negative plates to enable the use of lower concentrations (approximately 1% by weight). In either case, in view of its cost, this constituent is not presently considered commerically attractive.

Inhibitor Theory

In view of the drawbacks of those oxidation inhibitors which have previously been employed, it has been attempted to identify the desirable properties of such inhibitors to aid in the search for commercially useful agents for this purpose. It has been found that suitable oxidation inhibitors should not have soluble salt-like characteristics. The reason for this is that materials which ionize in water to form an electrolyte also tend to permit the formation of lead-air type fuel cell reactions which are detrimental to the operation of the battery. For example, sodium sulfate is an ineffective oxidation inhibitor since it dissolves in water and ionizes. The key property of a good anti-oxidant agent is that it forms strong ligands with lead which are non-ionic in character and highly insoluble, but which readily dissociate on contact with battery acid. For example, calcium sulfate, which is insoluble in water, is not a good inhibitor.

As noted above, it is also essential that the oxidation inhibitor waterproof the surface of the negative plates. Accordingly, the agent must be insoluble in water and yet be soluble in battery acid. It has been found that aliphatic agents such as stearic acid are insoluble in both water and battery acid and therefore cannot be successfully used as antioxidants for negative plates. Aromatic materials are generally insoluble in water, but soluble in battery acid (sulfuric acid), and thus may prove useful.

In summary, an ideal chemical oxidation inhibiting agent should:

1. Water proof the dried plate, but wet in battery acid;
2. Form a water insoluble compound with the lead paste which dissolves in battery acid;
3. Keep the lead paste in the reduced state;
4. Be soluble in hot water to achieve a concentration of about 1% by weight;
5. Be inexpensive; and
6. Not poison the plate.

While many potentially useful oxidation inhibitors have been tested, very few satisfy all of the foregoing criteria. For example, boric acid satisfies 2, 4 and 5, but not 1, 3 and 6. 1-Hydroxy-2-naphthoic acid (A.O.N.) satifies 1, 2, 3 and 6, but not 4 and 5.

In view of the foregoing, it is apparent that despite much prior work in this field a need remains for an inexpensive and effective oxidation inhibitor for the drying of negative battery plates to enable production of dried, waterproof plates which are readily wet by battery acid.

SUMMARY OF THE INVENTION

It is therefore a primary object of the present invention to provide an improved agent for the inhibition of oxidation during the drying of negative plates for use in dry charge storage batteries.

It is another object of the invention to provide an improved oxidation inhibitor which is easily applied to the negative plates, for example, in solution in hot water, to achieve a useful concentration or deposition in the negative plate.

It is another object of the invention to provide an improved oxidation inhibitor which is insoluble in cold water and which waterproofs the plates, but which is readily soluble in battery acid.

It is another object of the invention to provide an improved oxidation inhibitor having the foregoing properties which is also inexpensive and which does not reduce the efficiency of the plates in use.

These and other objects of the present invention which will become apparent are achieved using two closely structurally related compounds which have been found to be highly effective as oxidation inhibitors for the drying of negative battery plates, and in waterproofing the dried plates against aqueous absorption of moisture from the air with consequent loss of electrical charge. Moreover, these agents have been found to dissolve immediately on contact with battery acid and thus do not interfere with activation of the dry plates for use. The two compounds are salicylic acid and 2-naphthol.

Salicylic acid is not only highly effective as an inhibitor of oxidation of wet negative battery plates during drying, but is easily handled and applied since it is odorless, stable, non-toxic and highly soluble in hot water; is effective at low concentrations; provides good waterproofing of the dried plates; is instantaneously soluble in battery acid; and even improves cranking performance of the finished plates on cycling. Either hot air, or hot or cold flowing air may be used to dry plates inhibited with salicylic acid. Use of the sodium or ammonium salts of salicylic acid is to be avoided, since they dissolve in water and ionize.

2-Naphthol, like salicylic acid, satisfies all the requirements of a good oxidation inhibitor. This agent is not soluble in cold water but is soluble in hot water, which facilitates its application to the plates to provide a hydrophobic coating on the treated plates. Unlike salicylic acid, 2-naphthol has a faint, but unobjectionable odor, and flowing air is required to minimize oxidation during the critical moisture level of the drying operation. However, the cost of this material is somewhat less than that of salicylic acid, which is itself relatively inexpensive.

The effectiveness of salicylic acid and 2-naphthol as oxidation inhibitors for the drying of wet negative plates in dry charge applications is particularly unobvious in view of the fact that closely structurally related compounds, such as phenol, are totally ineffective in this regard.

The Method of Treatment

Freshly produced, formed negative battery plates for use in dry charge storage batteries, produced by procedures known in the art, are washed with running water for about one hour or until electricity cannot freely pass. The washed plates are then soaked in a hot (about 120° to about 160° F., preferably about 140° F.) aqueous solution of the selected treating agent for approximately 1–5 minutes and then dried, preferably with hot or cold flowing air. The concentrations of the aqueous solutions of treating agent may range for example, from about 0.5% up to the saturation concentration, if desired; preferably about 1% by weight, depending upon the treating agent and the concentration desired to be deposited on the treated plate.

The concentration of the treating solution is suitably selected to deposit at least about 0.1 g. up to about 1 g. of treating agent and preferably about 0.2 g. dry weight of treating agent on a standard 4" by 5" battery plate. Lesser loadings may be employed with reduced effect. Higher loadings up to those obtainable with saturated solutions of the treating agent may also be used, if desired. A saturated solution of salicylic acid, about 1.7% by weight at 75° C., will deposit about 0.3 g. of treating agent on a standard plate. Of course, higher concentrations of salicylic acid may be obtained in water at a higher temperature. Therefore, the temperature of the treating solution should be selected to provide the desired concentration of treating agent. The treating temperature should not be so high as to damage the plate; about 140° C. being the preferred temperature.

Similar concentrations of aqueous treating solutions of 2-naphthol may be employed also preferably at temperatures up to about 140° F.

To further illustrate the unexpected effectiveness of the treating agents of the present invention and the unpredictability of their effectiveness, it is noted that none of the following agents which might suggest themselves, was found to be effective: phenol, formaldehyde, boric acid, stearic acid, p-tert butyl phenol, hydroquinone, resorcinol, di-tert butyl phenol, pyrocatechol, sterylamine, dibutyl phosphate, 8-hydroxy quinoline nicotinic acid, anthranilic acid, zinc (electroplated), mineral oil, tri butyl phosphate, phosphoric acid, EDTA (ethylene diamine tetracetic acid), BHT (Butylated hydroxy toluene), benzylamine, dibenzylamine, 2-hydroxyl naphthalene, o-phenylene diamine and propynol.

The invention will now be illustrated in greater detail in the following suggested procedures.

EXAMPLE I

Negative battery plates, formed according to conventional procedures, were first washed thoroughly with running water for approximately one hour. The washed plates were then soaked in a 1% by weight aqueous solution of salicylic acid at a temperature of about 140° F., for a period of about 5 minutes. The treated plates were then dried by forced air at either about 65° F. or about 160° F. unitl dry (plates dried at ambient temperature require more drying time than plates dried at elevated temperatures). During this process, the temperature of the plates was maintained at less than about 160° F.

The battery plates obtained exhibited no detrimental oxidation during drying, and had a coating of salicylic acid capable of preventing absorption of moisture on storage (with its attendant consequent loss of electrical charge), but which dissolved immediately on contact with battery acid (sulfuric acid) to produce an activated negative plate. The cost of this treatment is very low (on the order of 2.5 cents per battery) and the cranking power of the plates was enhanced. Indeed, such plates gave the same cranking power as a new wet battery.

EXAMPLE II

The general procedure disclosed in Example I was applied to the treatment of negative battery plates pasted with lead sulfate in connection with an aqueous solution of 2-naphthol of the same concentration. Plates of similar performance were obtained.

The foregoing treatment is not only effective and economical, but is also suited to small scale production with a minimum of capital investment. Indeed, all that is required is a hot water tank and an air blower. Accordingly, this method is also well adapted to operations wherein only occasional small runs are made. The resulting plates are especially suitable for use in tropical areas due to their excellent resistance to humidity in storage prior to use.

What is claimed is:

1. In a process for the production of lead-containing negative plates for use in a dry charge battery, which comprises drying wet negative plates while protecting them from oxidation, the improvement which comprises:

treating said wet negative plates prior to said drying operation with an aqueous solution of an oxidation inhibiting agent selected from the group consisting of
   salicylic acid, and
   2-naphthol,
   whereby said plates are protected against oxidation during drying; and
   whereby dry negative pates are obtained which are resistant to the absorption of water from the atmosphere on storage but are wet immediately by battery acid in use.

2. The process of claim 1 wherein the agent is employed in hot water at a concentration of about 1% by weight.

3. The process of claim 2 wherein the agent is employed as an aqueous solution at about 120° to about 160° F., and preferably about 140° F.

4. The process of claim 1, 2 and 3 wherein the plates are treated with the aqueous solution for up to about 5 minutes and are dried in circulating air at a temperature in the range from about 65° F. up to about 160° F.

5. A negative battery plate for use in a dry charge battery produced according to the process of claim 1, 2 or 3.

6. A negative battery plate for use in a dry charge battery produced according to the process of claim 4.

* * * * *